US008166112B2

(12) United States Patent
Singh et al.

(10) Patent No.: US 8,166,112 B2
(45) Date of Patent: Apr. 24, 2012

(54) VIRTUAL MAIL STORAGE FOR MAIL DISTRIBUTED USING CORPORATE DISTRIBUTION LISTS

(75) Inventors: Satyesh Singh, Rajnandgaon (IN); Prashant Kumar Singhai, Lalitpur (IN)

(73) Assignee: SAP AG, Walldorf (DE)

( * ) Notice: Subject to any disclaimer, the term of this patent is extended or adjusted under 35 U.S.C. 154(b) by 1042 days.

(21) Appl. No.: 11/345,875

(22) Filed: Feb. 2, 2006

(65) Prior Publication Data

US 2007/0180033 A1 Aug. 2, 2007

(51) Int. Cl.
*G06F 15/16* (2006.01)

(52) U.S. Cl. .......................... 709/206; 709/219

(58) Field of Classification Search .................. 709/206, 709/204
See application file for complete search history.

(56) References Cited

U.S. PATENT DOCUMENTS

| | | | |
|---|---|---|---|
| 5,826,269 A * | 10/1998 | Hussey | 707/10 |
| 6,442,600 B1 * | 8/2002 | Anderson | 709/217 |
| 6,629,130 B2 * | 9/2003 | Mertama et al. | 709/206 |
| 6,721,784 B1 * | 4/2004 | Leonard et al. | 709/206 |
| 6,993,590 B1 * | 1/2006 | Gauthier et al. | 709/231 |
| 7,130,878 B2 * | 10/2006 | Parsons et al. | 709/202 |
| 7,213,076 B2 * | 5/2007 | Bodin et al. | 709/232 |
| 2003/0105729 A1 * | 6/2003 | Waxler | 705/404 |
| 2003/0135561 A1 * | 7/2003 | Bodin et al. | 709/206 |
| 2004/0064561 A1 * | 4/2004 | Parsons et al. | 709/226 |
| 2004/0122847 A1 * | 6/2004 | Rodgers | 707/102 |
| 2005/0060381 A1 * | 3/2005 | Huynh et al. | 709/206 |
| 2005/0108402 A1 * | 5/2005 | Colson et al. | 709/227 |
| 2006/0015868 A1 * | 1/2006 | Rechterman et al. | 718/1 |
| 2006/0259556 A1 * | 11/2006 | Auhagen | 709/206 |

* cited by examiner

*Primary Examiner* — Firmin Backer
*Assistant Examiner* — Michael A Chambers
(74) *Attorney, Agent, or Firm* — Mintz, Levin, Cohn, Ferris, Glovsky and Popeo, P.C.

(57) ABSTRACT

A method for distributing email includes receiving an email generated by a sender and addressed to a plurality of intended recipients. The generated email is stored in a designated location. A virtual email is sent to the plurality of intended recipients. The virtual email contains information for viewing the stored email from the designated location.

22 Claims, 4 Drawing Sheets

VIRTUAL MAIL STORAGE FOR MAIL DISTRIBUTED USING CORPORATE DISTRIBUTION LISTS

BACKGROUND

1. Technical Field

The present disclosure relates to electronic mail and, more specifically, to virtual mail storage for mail distributed using corporate distribution lists.

2. Description of the Related Art

Electronic mail (email) has become a pervasive method for communication, especially in the corporate environment. Email allows for quick and seamless communication between sender and recipient whether they are located in the same building or overseas.

Email may be formatted according to widely accepted protocols, for example Simple Mail Transfer Protocol (SMTP), and routed, for example, over the internet, from sender to recipient.

Within the corporate environment, email may be managed by one or more mail servers. Mail servers may handle email transmission within the corporate environment, for example using proprietary protocols, and may be able to send and receive email over the internet, for example via a gateway that conforms the email to more widely accepted protocols. Users within such an environment may access the mail server via a mail client. For example, a proprietary mail server such as Microsoft Exchange Server (registered trademark of Microsoft Corporation) may be accessed using a Microsoft Outlook (registered trademark of Microsoft Corporation) mail client.

Email systems such as the Microsoft Exchange Server may store sent and received emails associated with each user in a database. The storage size of this database may be subject to physical limitations, such as the maximum storage capacity of the server computer that the mail server runs on. Additionally, the mail server may limit the database size regardless of the available storage space. For example, the mail server may limit the database to 16 gigabytes (GB).

As the use of email increases, corporations managing mail servers must find ways of accommodating and/or reducing the increased storage demands. One typical solution is to increase the available storage capacity by employing a scalable storage solution such as a Redundant Array of Independent Disks (RAID). Another typical solution is to upgrade the mail server to a more robust program that does not impose a database size limit. However, both of these options may be very expensive.

To further exacerbate the problem, the attachment of files such as documents, pictures, and executable binaries often results in greatly increased email size.

Email distribution lists may be used to simultaneously send the same email to multiple recipients. Mail clients often incorporate distribution list capabilities to allow users to easily send an email to a select group of people. While some distribution lists are limited to a relatively small number of people, for example a department or a work group, other distribution lists may be quite large. For example, it is common for a mail client to provide an "all employees" distribution list. As large multi-national corporations may have upwards of 30,000 employees, even a relatively small email may use substantial database resources as it is replicated to over 30,000 user mailboxes throughout the email system. For example, a 100 kilobyte (KB) email sent to 30,000 employees translates to approximately 3 GB of data on the database.

In addition to or instead of storing sent emails on server storage, users may move email to a local storage space. The local storage space may be a database maintained on the user's personal computer. For example, emails may be moved to a local PST file that contains a database of stored emails. While moving emails to local storage may reduce the burden on the server storage, the availability of local storage space may be similarly limited.

It is therefore desirable to reduce the storage space required to store emails sent over distribution lists.

SUMMARY

A method for distributing email includes receiving an email generated by a sender and addressed to a plurality of intended recipients. The generated email is stored in a designated location. A virtual email is sent to the plurality of intended recipients. The virtual email contains information for viewing the stored email from the designated location.

A system for distributing email includes a server-side receiving unit for receiving an email generated by a sender and addressed to a plurality of intended recipients. A storing unit stores the generated email in a designated location. A sending unit sends a virtual email to the plurality of intended recipients. The virtual email contains information for viewing the stored email from the designated location.

A computer system includes a processor and a program storage device readable by the computer system, embodying a program of instructions executable by the processor to perform method steps for distributing email. The method includes receiving an email generated by a sender and addressed to a plurality of intended recipients. The generated email is stored in a designated location. A virtual email is sent to the plurality of intended recipients. The virtual email contains information for viewing the stored email from the designated location.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
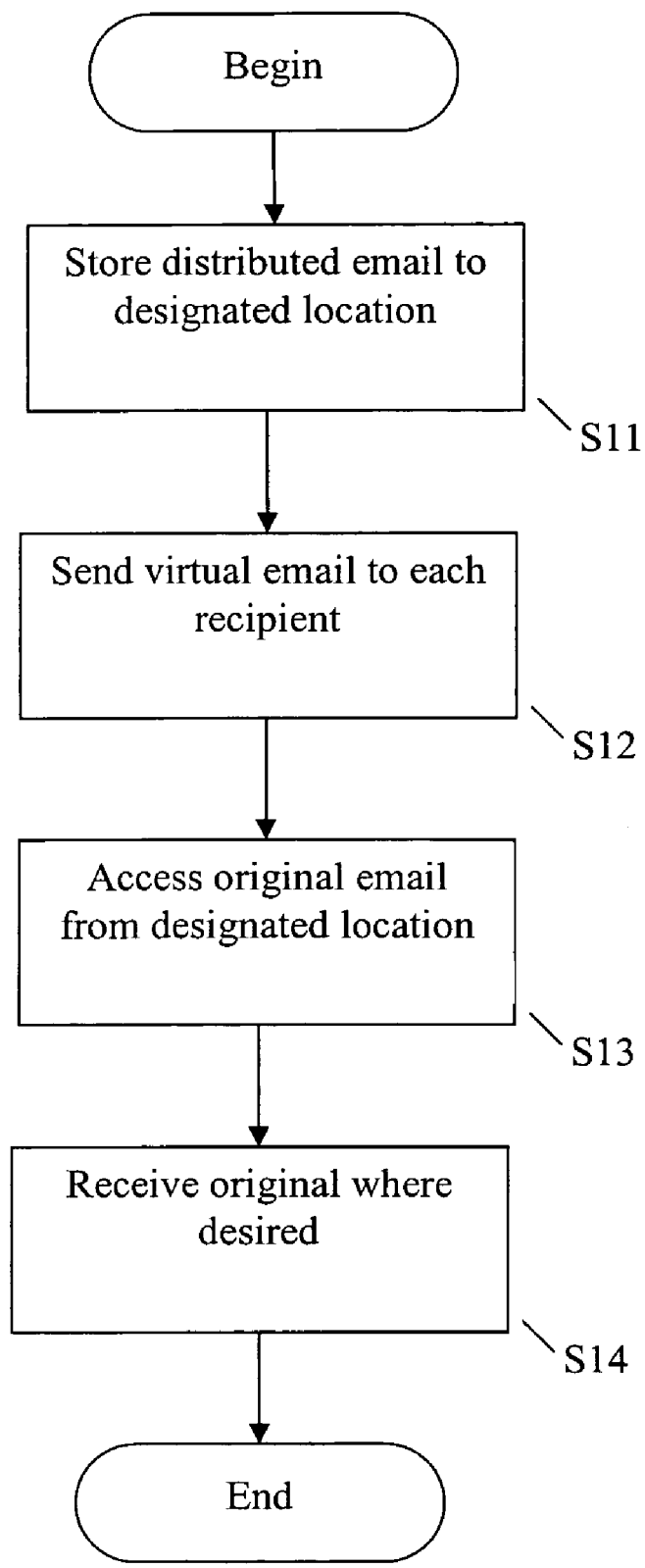
FIG. 1 is a flow chart showing a method for distributing email according to an embodiment of the present disclosure.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Embodiments of the present disclosure seek to reduce the storage space required to store emails sent over distribution lists. According to one embodiment of the present disclosure, a sender may generate an email. The email may be a text based email and/or an HTML based email with text, formatting, and graphical elements. The email may also include one or more binary attachments. The sender then addresses the email to multiple recipients, for example, by using an email distribution list, as described below. An email server receives the email from the sender and stores the email in a storage location associated with the server. The server then sends virtual emails to the recipients. The virtual emails may contain header information and location information for locating the original email on the server. According to one embodiment of the present disclosure, the virtual emails do not contain the text of the email form the body portion of the email or optional email attachments. The virtual emails may be a stub file. The recipients then receive the virtual emails and the virtual emails are used to locate the original email on the storage location.

According to one embodiment of the present disclosure, the recipients use an email client that is configured to read the virtual email and use the header information and location information of the virtual email to allow the recipients to view the original emails, including the email body text, directly from the storage location without having to permanently store a copy of the email at the client-side. In this way, the handling of the virtual email is transparent to the recipients. For example, when a virtual email is received, the recipient's email client may display header information such as the sender, the subject line and the send time and date in the recipient's inbox. The recipient may not be able to distinguish the received virtual email from a received conventional email. When the recipient opens the virtual email, the email client will locate the original email from the storage location and display the body of the email to the recipient. The recipient may close and delete the email without awareness of the virtual nature of the email.

FIG. 1 is a flow chart showing a method for distributing email according to an embodiment of the present disclosure. A sender may compose an email addressed to multiple recipients, for example, using an email distribution list. When the sender proceeds to "send" the composed email, the email server identifies that the email is an email addressed to multiple recipients and initiates special processing of the present disclosure. The special processing may include the following steps: An email server may store the email to a designated location (Step S11). The designated location may be, for example, storage space located on a network file server. The distributed email need not be sent to each recipient user account, for example, those recipient users included on the distribution list. The email server may send a virtual email to each recipient user account in place of the original distributed email (Step S12). Each recipient may then access the original distributed email from the designated location (Step S13), for example, using an email client application. Each recipient may choose to receive original distributed email should the need arise (Step S14).

The original distributed email may be, for example, a conventional email containing a text body with one or more optional binary attachments. The email may be addressed to more than one recipient. For example, a plurality of email addresses may be manually entered within the "To" field of the email as it is written. Alternatively, an email distribution list may be referenced in the "To" field so that the email is to be sent to every recipient email address that has been associated with the particular distribution list. For example, an email distribution list entitled "All" may be used to send the email to every employee on a corporate email server.

Email distribution lists may be constructed by a system administrator and/or a particular user. In constructing the email distribution list, one or more user's email addresses may be associated with the email distribution list.

In the conventional scenario, an email addressed to an email distribution list is sent to every email address associated with the email distribution list. The sending of an email, in the conventional scenario, may include routing a copy of the email to each of the desired recipients. This may be handled, for example, exclusively by the email server, where the sender and each recipient are served by the same email server. Where one or more of the recipients have email addresses that are not served by the email server, a copy of the email may be routed to an external email server, for example, via a gateway.

According to embodiments of the present disclosure, a designated location may be utilized for storing an email sent via a distribution list. The designated location may be used as an alternative location for storing the email so that a copy of the same email need not be sent to the mailbox locations of each recipient associated with the distribution list. According to one embodiment of the present disclosure, a specified folder associated with the particular distribution list may be created, for example, when the distribution list is established. This specified folder may then be used as the designated location.

A copy of each email sent by a particular user is generally stored in the "sent mail" folder of that user. This "sent mail" folder may be used as the designated location to further reduce the extra storage requirements of the present disclosure.

According to embodiments of the present disclosure, virtual emails may be sent to each email address associated with the distribution list. The virtual email may contain header information, for example, "from" information, "to" information, "cc" information, "bcc" information, send date information, subject information, importance information, etc. The virtual email may also contain the location of the designated location where the original email is stored. This may be, for example, the folder associated with the distribution list and/or the "sent mail" folder of the user who sent the original email. According to one embodiment of the present disclosure, the virtual email does not include the body text of the email.

The virtual email may be little more than a stub file. For example, the virtual email may be one or more packets including the desired header information and/or the designated location where the original email may be found. The virtual email may require significantly less storage space than the original email.

The virtual email may also reference an email id number associated with the original email stored in the designated location to facilitate the eventual retrieval/access of the original email by the recipients as required.

To the extent that one or more email addresses associated with the distribution list are not served by the email server, copies of the original email may be sent to these "external" recipients according to the conventional approach.

Each recipient user may then access the original distributed email from the designated location. For example, when a particular recipient wishes to read the original email, a request may be sent to the mail server indicating the email id number of the desired original email. The mail server may then locate the desired original email and send it to the recipient, for example, in a temporary memory, for example RAM. The recipient may therefore view the email without having to store a permanent copy to their mailbox on the server and/or there offline storage space or PST file.

The recipient may then choose to delete the virtual email, store it indefinitely or retrieve a copy of the original email. If the recipient chooses to delete the virtual email, that recipient may not be able to easily retrieve that email at a later point. If the recipient chooses to store the virtual email indefinitely, the recipient may be able to view the original email as desired for as long as the original email remains in the designated location. If the recipient chooses to retrieve a copy of the original email, the email viewed from the designated location may be written to the user's mailbox and/or offline storage in place of the virtual email.

The recipient may chose to forward or reply to the email. In this event, the original email may be copied to the client-side and handled like a normal email. Alternatively, the body text of the original email may be read from the storage location and copied to the forward/reply email so that the body text of the original email may appear as part of the forward/reply email to maintain the functionality of conventional emails.

Under certain circumstances, the original email may be retrieved transparently from the designated location. For example, when the recipient chooses to reply to and/or forward the received email, the email may be retrieved and included in the reply and/or forward rather than including the virtual email in the reply/forward.

Embodiments of the present disclosure may be implemented transparently so that recipients of distributed email may be unaware that the original email is being stored in the designated location rather than in their personal mailbox. This may be implemented by configuring the recipient's email clients to show unopened emails based on the information of the virtual email and configuring the email client to fetch the full email from the designated location when the user opens the email.

Alternatively, embodiments of the present disclosure may be implemented without the need to modify the recipients email clients. For example, the virtual email may be an actual email containing header information and a link for viewing the original email from its designated location. For example, the virtual email may contain a URL to the original email from the designated location.

Embodiments of the present disclosure may utilize a mail server that is distributed over two or more server computers. For example, a network of server computers may be used to provide mail service. The configuration of server hardware need not have a bearing on the execution of embodiments of the present disclosure. Moreover, embodiments of the present disclosure may be executed across a plurality of servers, where the distribution list may be created using a server, the user sending the distributed email may have an email account on the same or different server, and one or more recipient email addresses associated with the distributed email may have email accounts on the same or different servers. Embodiments of the present disclosure are herein described as using a single mail server as a simple example and embodiments of the present disclosure should not be seen as being limited to any particular configuration of servers.

For example, one or more replication servers may be used, for example, to provide load balancing and failover support for the email server. Where replication servers are used, the original email may be replicated along with the specified folder associated with the distribution list.

Figure 2:
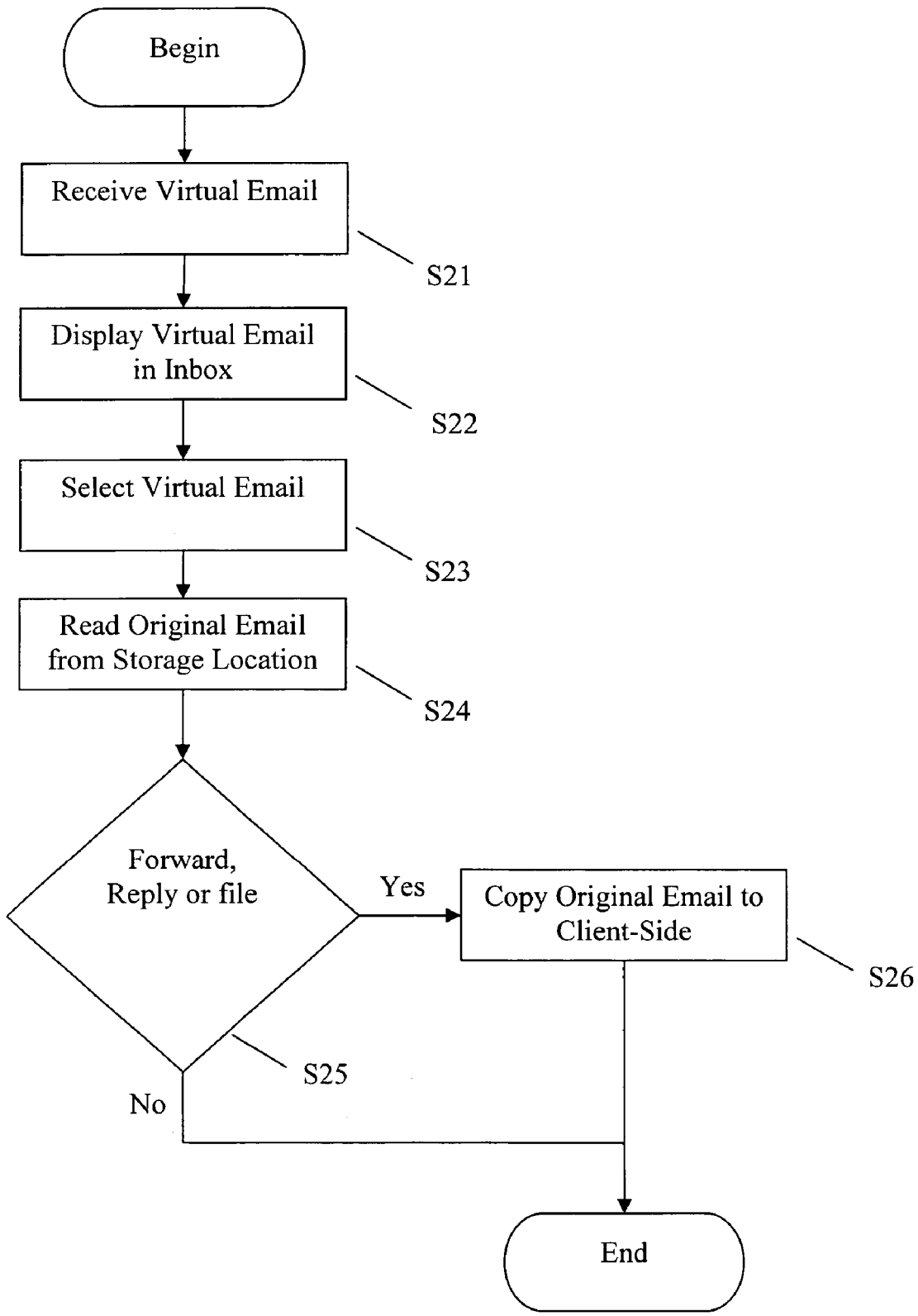
FIG. 2 is a flow chart showing reception of an email according to an embodiment of the present disclosure.

FIG. 2 is a flow chart showing reception of an email according to an embodiment of the present disclosure. The recipient may receive the virtual email (Step S21). The virtual email may then be displayed in the recipient's inbox (Step S22). For example, the recipient's email application may accept the virtual email and place an entry in the recipient's inbox specifying the sender, subject, and time and date of the transmission. The recipient may then select the virtual email (Step S23). For example, the recipient may "open" the email within the inbox. The email client may then read the original email from the storage location (Step S34). For example, the email client may use the address information stored within the virtual email to locate the original email and display its body text to the recipient as though a conventional email has been opened. After reading the email, the recipient may choose to close and delete the email, in which case the virtual email will be deleted, or to utilize the email (Step S25). Utilization of the email may include, for example, forwarding the email to another recipient, replying to the sender, or filing a copy of the email in an "old mail" directory for future reference.

In conventional email, forwarding or replying to an email may comprise generating a new email containing the body text of the old email. Filing the email comprises placing a copy of the email within a directory structure. When such an action is desired (Yes, Step S25), a copy of the original email's body text may be copied to the client side (Step S26). For example, in the case of forwarding or replying, a new email may be created with the body text of the original email incorporated into the body of the new email. In the case of filing the email, a complete copy of the original email may be copied and stored in folders maintained by the client.

Figure 3:
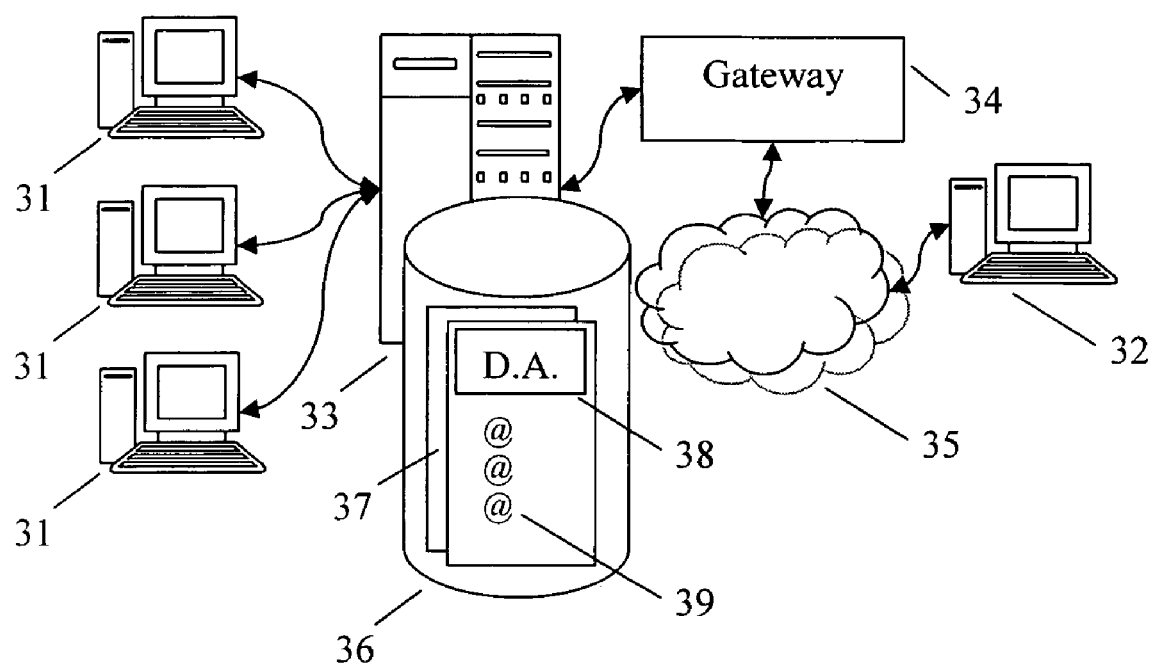
FIG. 3 is a block diagram showing a system for distributing email according to an embodiment of the present disclosure.

FIG. 3 is a block diagram showing a system for distributing email according to an embodiment of the present disclosure. One or more local client terminals 31 may be used to send or receive emails. The local client terminals 31 may be connected to a mail server 33. The mail server 33 may be run on either a single server computer or multiple distributed server computers. The mail server 33 may be capable of routing emails to other local client terminals 31 or to one or more remote client terminals 32, for example via a gateway 34 across a wide area network 35, for example, the internet. The mail server 33 may include a database 36. The database 36 may be used to store received email in user-specific mailbox areas. There may be, for example, one such mailbox within the database 36 for each local client terminal 31 (in this example there is assumed to be one user and thus one user-specie mailbox area for each local client terminal). There may also be one or more distribution lists 37 defined, for example, within the database 36. Each distribution list 37 may have a listing of associated recipient email addresses 39. A designated area (D.A.) for storing original distributed emails 38 may exist associated with each distribution list 39. The designated area may also/alternatively be located within the local client terminal 31 that originates the original email. When an original email is sent form an originating local client terminal, that may be one of the local client terminals 31, to multiple recipients, that may be one or more of the local client terminals 31 or remote client terminals 32, using a distribution list 37, the original email may be stored within the designated area 38 and a virtual email may be sent to each of the multiple recipients for whom email addresses 39 are associated with the distribution list 37. The virtual email may then be used by each recipient to view the original email stored in the designated area 38.

As used herein, the term email may be any electronic communication such as, for example, an SMTP message, instant message, text message, or any other form of electronic communication containing text and/or binary data. For example, an SMTP email with a binary file attachment.

Figure 4:
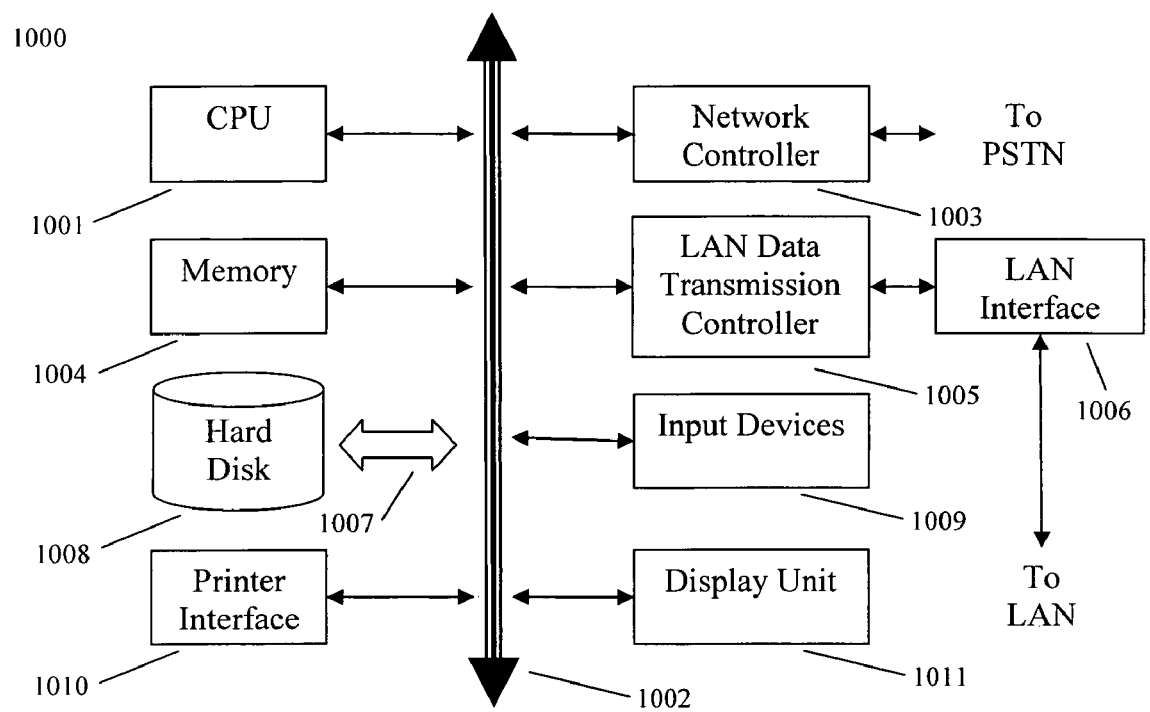
FIG. 4 shows an example of a computer system capable of implementing the method and apparatus according to embodiments of the present disclosure.

FIG. 4 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method for distributing email by an email server, comprising:
   receiving, by the email server, a first email encapsulating data generated by a sender and addressed to a plurality of recipients, a first portion of the plurality of the recipients having email addresses served by the email server that serves the email address of the sender, wherein the email server serves the email address of the sender;
   storing, by the email server, the generated email in a designated location, wherein the designated location comprises a sent folder of the sender which is accessible to at least one of the first portion of the plurality of the recipients and not accessible to at least one of the second portion of the plurality of the recipients;
   sending, by the email server, a second email to the at least one of the first portion of the plurality of the recipients, wherein the second email comprises information a link to the stored email at the designated location;
   sending, by the email server, a third email to the at least one of the second portion of the plurality of the recipients, the third email comprising the encapsulated data from the received email so that the third email can be viewed without accessing the stored email,
   receiving the second email at a first client-side;
   opening the second email in a client e-mail application, the client email application configured to present the second email to the recipient as if it were a conventional email such that the handling of the second email is transparent to the recipient;
   receiving the third e-mail at a second client-side; and
   displaying the third mail in a second inbox, wherein the third email is displayed in the inbox without access the encapsulated data at the designated location.

2. The method of claim 1, wherein the first email is one of a text document or and a hypertext markup language document.

3. The method of claim 1, additionally comprising forwarding the second email, by at least one of the first portion of the plurality of the recipients, the forwarding of the second email comprising copying the body of the generated email from the designated location to a new email addressed to a forwarding email address.

4. The method of claim 1, additionally comprising replying to the-second email, the replying to the second email comprising copying the body of the generated email from the designated location to a new email addressed to the sender of the generated email.

5. The method of claim 1, wherein the first email is addressed to a plurality of the recipients using a distribution list.

6. The method of claim 5, wherein the designated location is associated with the distribution list.

7. The method of claim 1, wherein the second email comprises header information and information for locating the original email at the designated location.

8. The method of claim 1, wherein the second email comprises an email id number.

9. The method of claim 1, wherein the step of opening the second email is performed by the recipient using a client email application, the client email application configured to present the second email to the recipient as if it were a conventional email such that the handling of the second email is transparent to the recipient.

10. The method of claim 1, wherein the second email comprises a link to the stored email in the designated location.

11. A computer system comprising:
    an email server having a processor; and
    a program storage device readable by the computer system, embodying a program of instructions executable by the processor to perform method steps for distributing email, the method comprising:
    receiving, by the-email server, a first email generated by a sender and addressed to a plurality of recipients, a first portion of the-plurality of the recipients having email addresses served by the email server, wherein the email server serves the email address of the sender;
    storing, by the-email server, the generated email in a designated location, wherein the designated location comprises a sent folder of the sender which is accessible to at least one of the first plurality of the recipients and not accessible to at least one of the second plurality of the recipients;
    sending, by the-email server, a second email to the at least one of the first plurality of the recipients, wherein the-second email-comprises information for viewing the stored email from the designated location, wherein the second e-mail is displayed in the inbox of a client application as if it were a conventional email by opening the second email so that it displays the body of the generated email from the designated location without making a permanent copy of the first email body at the client-side; and
    sending, by the email server, a third email to the second portion of the recipients, the-third email comprising the encapsulated data from the received email so that the third email can be viewed without accessing the stored email.

12. The computer system of claim 11, wherein the first email is one of a text document and a hypertext markup language document.

13. The computer system of claim 11, wherein the method further comprises: forwarding the second email, the forwarding of the second email comprising copying the body of the generated email from the designated location to a new email addressed to a forwarding email address.

14. The computer system of claim 11, wherein the method further comprises: replying to the-second email, the replying to the second email comprising copying the body of the generated email from the designated location to a new email addressed to the sender of the generated email.

15. The computer system of claim 11, wherein the first email is addressed to a plurality of the recipients using a distribution list.

16. The computer system of claim 15, wherein the designated location is associated with the distribution list.

17. The computer system of claim 11, wherein the virtual email comprises header information and information for locating the original email at the designated location.

18. The computer system of claim 11, wherein the second email comprises an email id number.

19. The method of claim 1, wherein the second email excludes at least a portion of the first email.

20. The computer system of claim 11, wherein the second email excludes at least a portion of the first email.

21. A non-transitory computer readable media storing instructions, which when executed by one or more data processors, causes the one or more data processors to perform operations comprising:

receiving, by an email server, a first email encapsulating data generated by a sender and addressed to a plurality of recipients, a first portion of the plurality of the recipients having email addresses served by the email server that serves the email address of the sender, wherein the email server serves the email address of the sender;

storing, by the email server, the generated email in a designated location, wherein the designated location comprises a sent folder of the sender which is accessible to at least one of the first portion of the plurality of the recipients and not accessible to at least one of the second portion of the plurality of the recipients;

sending, by the email server, a second email to the at least one of the first portion of the plurality of the recipients, wherein the second email comprises information a link to the stored email at the designated location;

sending, by the email server, a third email to the at least one of the second portion of the plurality of the recipients, the third email comprising the encapsulated data from the received email so that the third email can be viewed without accessing the stored email, receiving the second email at a first client-side;

opening the second email in a client e-mail application, the client email application configured to present the second email to the recipient as if it were a conventional email such that the handling of the second email is transparent to the recipient;

receiving the third e-mail at a second client-side; and displaying the third mail in a second inbox, wherein the third email is displayed in the inbox without access the encapsulated data at the designated location.

22. The computer readable medium of claim 21, wherein the second email excludes at least a portion of the first email.

* * * * *